(12) United States Patent
Holt, Jr.

(10) Patent No.: US 9,474,252 B2
(45) Date of Patent: Oct. 25, 2016

(54) FABRIC PET HARNESS AND ITS METHOD OF MANUFACTURE

(71) Applicant: Coastal Pet Products, Inc., Alliance, OH (US)

(72) Inventor: Robert C. Holt, Jr., North Canton, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 120 days.

(21) Appl. No.: 14/173,993

(22) Filed: Feb. 6, 2014

(65) Prior Publication Data

US 2014/0261238 A1 Sep. 18, 2014

Related U.S. Application Data

(60) Provisional application No. 61/776,986, filed on Mar. 12, 2013.

(51) Int. Cl.
*A62B 35/00* (2006.01)
*A01K 27/00* (2006.01)

(52) U.S. Cl.
CPC .................................. *A01K 27/002* (2013.01)

(58) Field of Classification Search
CPC .................................................. A01K 27/002

USPC ................................................. 119/856, 857
See application file for complete search history.

(56) References Cited

U.S. PATENT DOCUMENTS

| | | | |
|---|---|---|---|
| 6,443,101 B1* | 9/2002 | Fazio | A01K 27/002 119/792 |
| 7,343,881 B2* | 3/2008 | Schantz | A01K 13/006 119/771 |
| 8,166,924 B2* | 5/2012 | Cho | A01K 27/002 119/792 |
| 8,701,601 B2* | 4/2014 | Hunt | A01K 27/004 119/770 |

OTHER PUBLICATIONS

Liz Johnson, Pillow Personality with Fairfield Processing: How to Make and Attach Piping for Pillows & More, Aug. 21, 2012, Sew 4 Home, http://www.sew4home.com/tips-resources/sewing-tips-tricks/pillow-personality-fairfield-processing-how-make-and-attach-piping, retrieved: Oct. 21, 2015.*

* cited by examiner

*Primary Examiner* — Kristen C Hayes
(74) *Attorney, Agent, or Firm* — Renner, Kenner, Greive, Bobak, Taylor & Weber

(57) ABSTRACT

A pet harness 10 includes a body portion (11) made of two sheets of fabric material (14). A cord (15), having a fabric piping (18) positioned around it, is attached to the periphery of the body portion (11). A plurality of straps (12) are attached to the fabric material (14) and to the cord (15).

9 Claims, 3 Drawing Sheets

FABRIC PET HARNESS AND ITS METHOD OF MANUFACTURE

CROSS REFERENCE TO RELATED APPLICATION

This application claims priority from U.S. Provisional Patent Application Ser. No. 61/776,986 filed on Mar. 12, 2013, which is incorporated herein by reference in its entirety.

TECHNICAL FIELD

This application relates to pet harnesses. More particularly, this application relates to pet harnesses which include a fabric or mesh material. Specifically, this application relates to the manner in which the fabric material and its connection to the straps of the harness may be strengthened.

BACKGROUND ART

Many pet harnesses merely include a plurality of interconnected straps. For the comfort of the animal, and for fashion purposes, some pet harnesses include a fabric portion which has the straps connected thereto. A problem associated with these harnesses is that the fabric will tend to tear at the connection of the straps thereby destroying the integrity of the harness. Such is particular prevalent in harnesses for larger dogs whose strength will tend to tear the fabric harnesses.

Thus, the need exists for a comfortable, attractive, fabric harness which has the strength to prevent the tearing of the straps from the fabric.

DISCLOSURE OF THE INVENTION

It is thus an object of one aspect of the present invention to provide a pet harness made of a fabric material in which the harness straps are securely attached to the material.

It is an object of another aspect of the present invention to provide a pet harness, as above, which is suitable for both small and large pets.

It is an object of an additional aspect of the present invention to provide a pet harness, as above, which is provided with a cord around the periphery of the fabric material, the straps being attached to the cord as well as to the fabric material.

It is an object of a further aspect of the present invention to provide a method of making a pet harness having increased strength.

These and other objects of the present invention, as well as the advantages thereof over existing prior art forms, which will become apparent from the description to follow, are accomplished by the improvements hereinafter described and claimed.

In general, a pet harness made in accordance with the present invention includes a body portion formed of at least two sheets of material. A cord is positioned adjacent to the sheets and extends around the periphery of the body portion.

A method of making one form of a pet harness of the present invention includes the steps of positioning a cord within a fabric piping, attaching the piping to the periphery of the sheets, attaching at least one strap to the sheets, and attaching the strap to the cord.

Preferred exemplary fabric pet harnesses made in accordance with the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
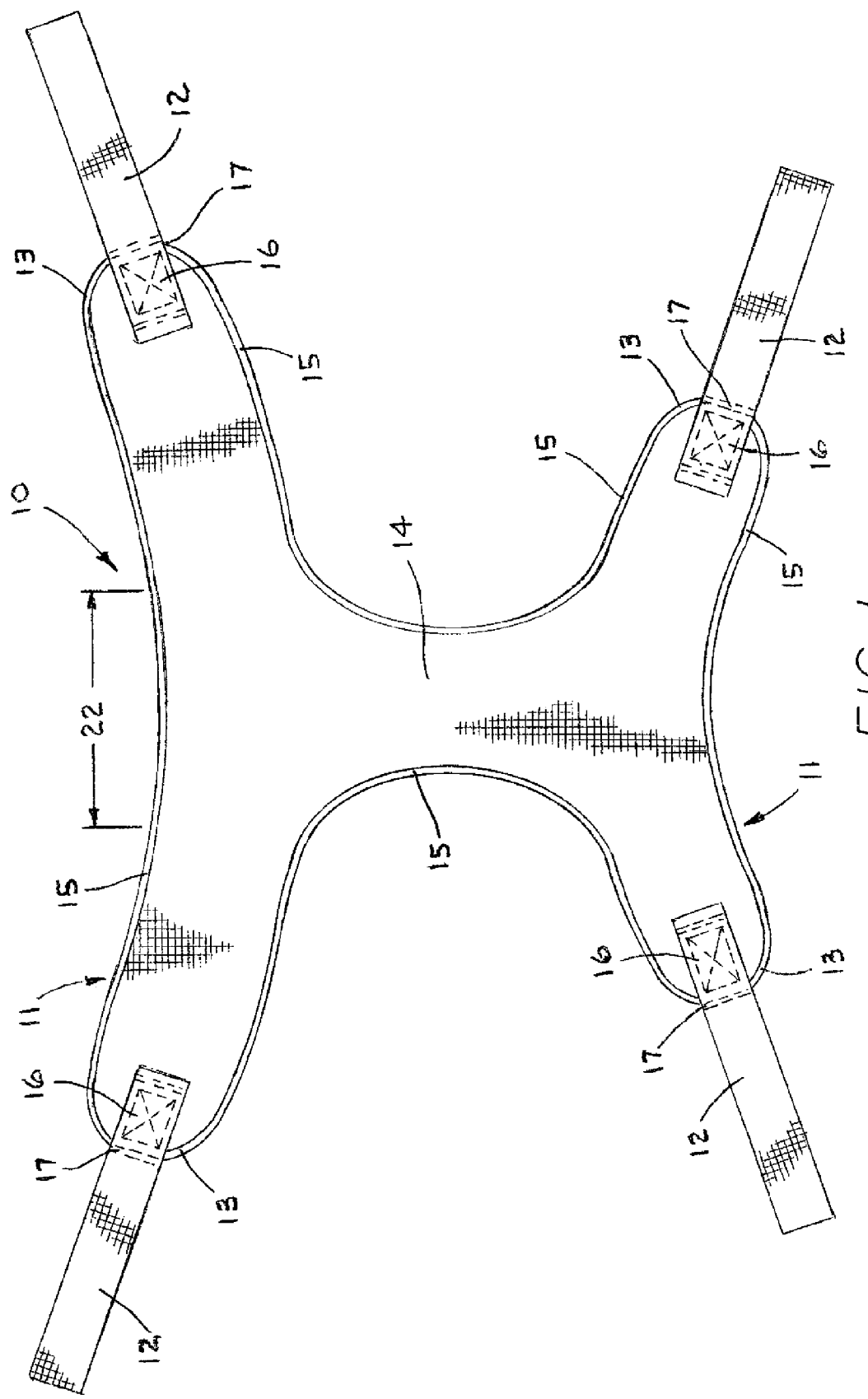
FIG. 1 is a somewhat schematic, fragmented, flattened plan view of a pet harness made in accordance with the present invention.

A pet harness made in accordance with the present invention is indicated generally by the numeral 10 and is shown in FIG. 1 as having a fabric or mesh body portion, generally indicated by the numeral 11, with straps 12 attached to the ends of the appendages 13 of body portion 11. As is known in the art, such straps extend around various portions of the body of the pet to attach the harness to the pet. The body portion 11 includes two sheets 14 of the fabric material, usually in the form of a mesh, with a cord 15 carried between or adjacent to them at the periphery thereof. Thus, cord 15 extends around the entire periphery of body portion 11.

Cord 15 not only provides a unique look to harness 10, but also it provides strength at the junction of straps 12 and body portion 11. As shown in FIG. 1, straps 12 may be attached to body portion by a conventional box stitch 16. However, if that were the only connection, and if there were no cord 15, the straps 12 could readily tear out of the fabric. But, in accordance with the present invention, each strap 12 may also be stitched to cord 15, as at 17. Thus, by stitching strap 12 to cord 15 at stitches 17, tearing the strap out of the fabric is highly unlikely.

Figure 2:
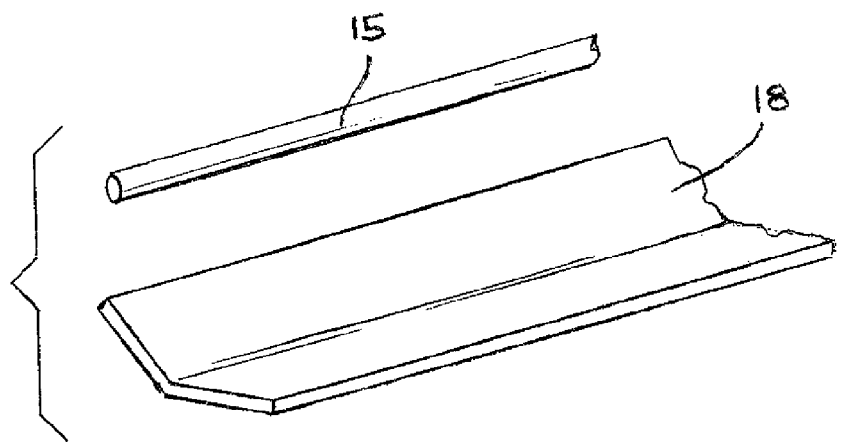
FIG. 2 is a fragmented perspective view of a cord and its piping which is provided on the harness of FIG. 1.
Figure 3:
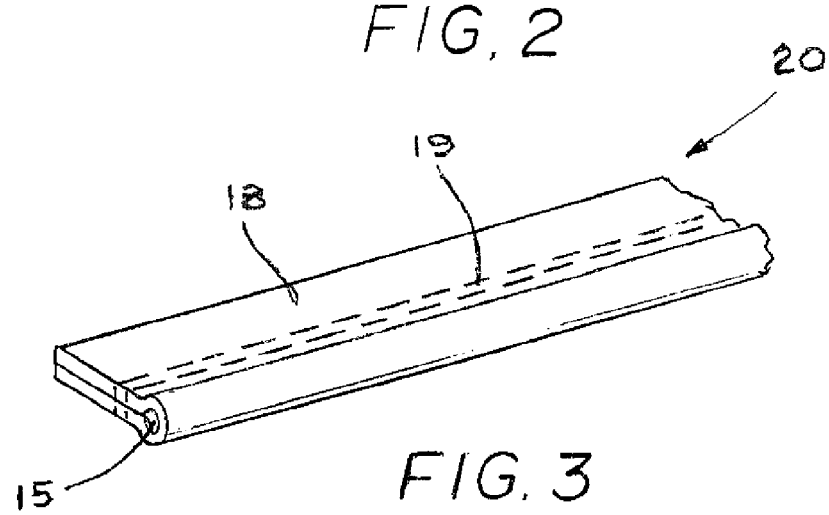
FIG. 3 is a fragmented perspective view of the assembled cord and piping, the piping having been sewn around the cord.

The manner in which harness 10 is constructed is best shown in FIGS. 2-5. FIG. 2 shows a cord 15 and a fabric piping 18 which are attached together as by stitching 19 to form a piping assembly generally indicated by the numeral 20 and shown in FIG. 3. Thus, fabric piping 18 is wrapped around cord 15 and stitched to itself, as at 19.

Figure 4:
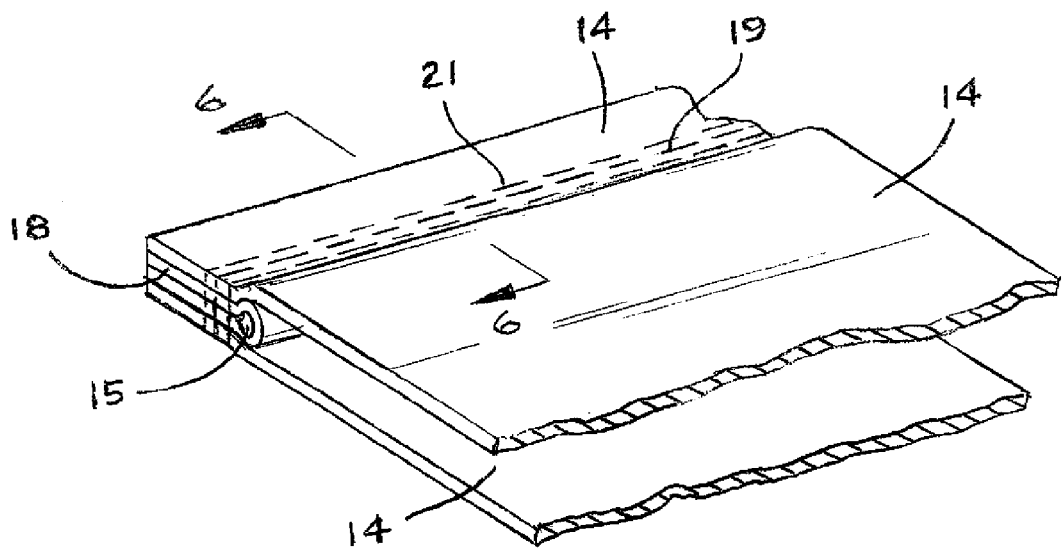
FIG. 4 is a fragmented perspective view showing the piping assembly attached to the fabric material.
Figure 6:
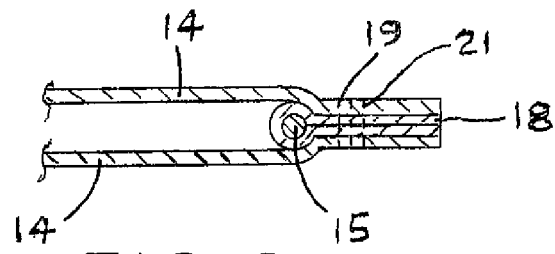
FIG. 6 is a sectional view taken substantially along line 6-6 of FIG. 4.

In order to attach piping assembly 20 to body portion 11, the two sheets 14 of fabric which makeup body portion 11 are cut to the desired shape, such as shown in FIG. 1, and are positioned back to back with the piping assembly 20 sandwiched therebetween after piping assembly 20 has been cut to the desired length. Then, as shown in FIGS. 4 and 6, stitching 21 is applied through the piping fabric 18, through the fabric sheets 14, and adjacent to the cord 15. Stitching 21 at this time is applied almost all the way around the periphery of body portion 11; however, in accordance with this embodiment, a small portion, which can be at any location around the periphery (an example being shown in FIG. 1 as portion 22), is not stitched for reasons now to be described.

Figure 5:
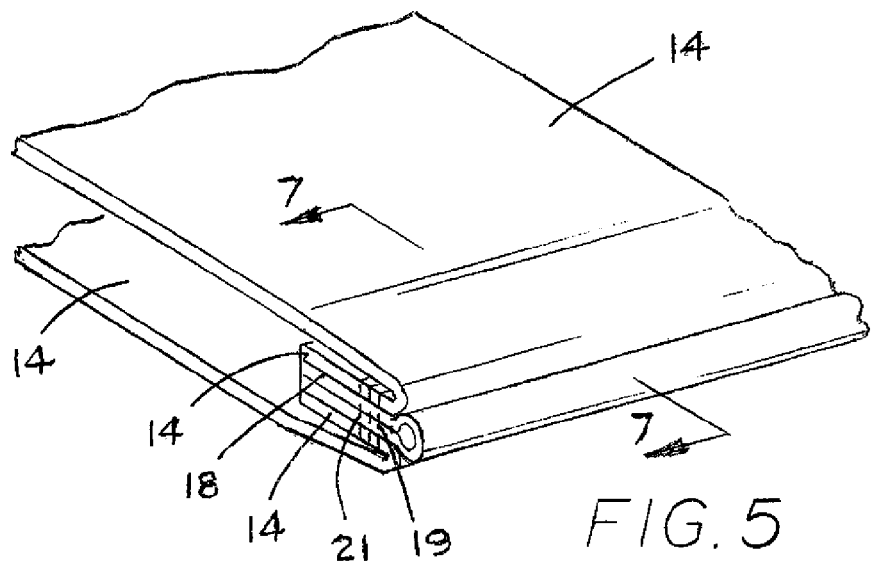
FIG. 5 is a fragmented perspective view showing the next step in the manufacturing process whereby that which is shown in FIG. 4 is turned inside out in the event that it is desired to hide the stitching.

If it is desired that stitching 21 be hidden in the final process, the unsewn portion may be used so that the fabric sheets 14 may be turned inside out, that is, so that the opposite sides of sheets 14 face each other as shown in FIG. 5. This is simply done by reaching inside through unsewn portion 22 between sheets 14, preferably with a suitable instrument, and pulling the sheets 14 out through unsewn portion 22. Then, as shown in FIG. 5, it can be seen that the stitching 21 is concealed and that the cord 15 is now positioned on the periphery of the body portion 11. At this time the unsewn portion 22 may be stitched and the finished body portion 11 is ready to receive straps 12 in a manner previously described with stitching 17 passing through cord 15.

Figure 7:
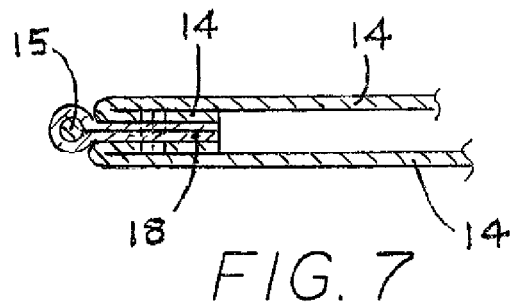
FIG. 7 is a sectional view taken substantially along line 7-7 of FIG. 5.
Figure 8:
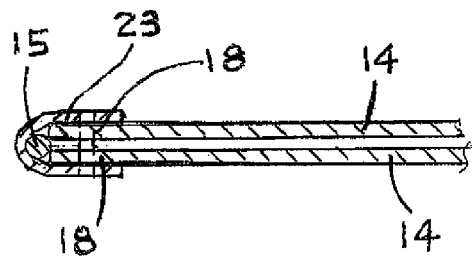
FIG. 8 is a sectional view of the construction of an alternative embodiment of the present invention.

An alternative embodiment for harness 10 is shown in FIG. 8. In order to construct this version of harness 10, a cord 15 is positioned adjacent to the edges of the fabric sheets 14. Then the fabric piping 18 is placed around the cord 15 and around the peripheral edge of sheets 14. Piping 18 is then stitched to sheets 14, as stitching 23. Then stitching 17 may be used to attach straps 12 to sheets 14 and cord 15. In this embodiment, the cord 15 does not show but the stitching 17 is exposed. However, this embodiment is easier to manufacture than that shown in FIGS. 5 and 7.

In view of the forgoing, it should be evident that a harness constructed as described herein accomplishes the objects of the present invention and otherwise substantially improves the harness art.

What is claimed is:

1. A pet harness comprising a body portion formed of at least two sheets of material, a cord positioned around the periphery of said sheets, piping positioned adjacent to said cord and attached to the edges of said sheets to hold said cord against the edges of said sheets, and at least one strap stitched to said sheets and stitched to said cord.

2. A pet harness comprising a body portion formed of at least two sheets of material, a cord positioned adjacent to said sheets and extending around the periphery of said body portion, and a plurality of straps attached to said sheets of material and directly to said cord.

3. The pet harness of claim 2 further comprising a fabric piping positioned around said cord.

4. The pet harness of claim 3 wherein said fabric piping is wrapped around said cord and stitched to itself.

5. The pet harness of claim 3 wherein said fabric piping is stitched to said sheets.

6. The pet harness of claim 5 wherein said cord is positioned outside of said sheets.

7. The pet harness of claim 5 wherein said cord is positioned adjacent to the edges of said sheets.

8. A pet harness comprising a body formed of at least two sheets of material, a cord, a fabric material having a first portion around said cord, a second portion extending between said sheets, said sheets being attached to said second portion so that said cord is positioned at the periphery of said sheets, and at least one strap stitched to said sheets and stitched to said cord.

9. A pet harness comprising a body portion formed of at least two sheets of material, a cord positioned adjacent to said sheets and extending around the periphery of said body portion, a fabric piping wrapped around said cord and stitched to itself, and at least one strap stitched to said sheets and stitched to said cord.

* * * * *